United States Patent [19]

Mehta et al.

[11] Patent Number: 5,541,584
[45] Date of Patent: Jul. 30, 1996

[54] REMOTE CONTROL FOR A CEILING FAN

[75] Inventors: Vinay Mehta, Germantown, Tenn.; Y. C. Chan, Kowloon, Hong Kong

[73] Assignee: Hunter Fan Company, Memphis, Tenn.

[21] Appl. No.: 288,207

[22] Filed: Aug. 9, 1994

Related U.S. Application Data

[63] Continuation of Ser. No. 883,575, May 15, 1992, abandoned.

[51] Int. Cl.$^6$ ............................................... H04Q 1/00
[52] U.S. Cl. ............................ 340/825.57; 340/310.01; 340/310.02; 340/825.77
[58] Field of Search .................... 340/310.01, 310.02, 340/825.57, 825.22, 825.77, 825.65, 825.43, 825.78; 327/194, 326, 421, 502, 584; 307/38, 39, 126, 130

[56] References Cited

U.S. PATENT DOCUMENTS

| | | | |
|---|---|---|---|
| D. 249,141 | 8/1978 | Mayo | D13/32 |
| D. 282,462 | 2/1986 | Hart | D13/99 |
| 3,721,830 | 3/1973 | Oishi et al. | 340/310 R |
| 3,943,421 | 3/1976 | Shibata et al. | 366/142 |
| 4,222,035 | 9/1980 | Lohoff | 340/825.57 |
| 4,245,321 | 1/1981 | Gennetten | 364/731 |
| 4,298,869 | 11/1981 | Okuno | 340/782 |
| 4,322,632 | 3/1982 | Hart et al. | 307/41 |
| 4,328,482 | 5/1982 | Belcher et al. | 340/310 A |
| 4,328,540 | 5/1982 | Matsuoka et al. | 364/167 |
| 4,371,814 | 2/1983 | Hannas | 318/16 |
| 4,398,178 | 8/1983 | Russ et al. | 340/310 A |
| 4,408,150 | 10/1983 | Holston et al. | 318/779 |
| 4,413,211 | 11/1983 | Fowler | 318/257 |
| 4,430,576 | 2/1984 | Fowler | 307/38 |
| 4,433,719 | 3/1984 | Cherry et al. | 165/26 |
| 4,465,956 | 8/1984 | Fowler | 318/268 |
| 4,538,973 | 3/1985 | Angott et al. | 417/572 |
| 4,548,554 | 10/1985 | Angott | 417/572 |
| 4,621,336 | 11/1986 | Brown | 364/557 |
| 4,621,992 | 11/1986 | Angott . | |
| 4,642,441 | 2/1987 | Kenyon | 219/364 |
| 4,649,323 | 3/1987 | Pearlman et al. | 315/307 |
| 4,689,547 | 8/1987 | Rowen et al. | 323/239 |
| 4,695,840 | 9/1987 | Darilek | 340/310 A |
| 4,716,409 | 12/1987 | Hart et al. | 340/825.22 |
| 4,719,446 | 1/1988 | Hart | 340/310 A |
| 4,721,953 | 1/1988 | de Pauw | 340/825.77 |
| 4,733,138 | 3/1988 | Pearlmann et al. | 315/307 |
| 4,734,871 | 3/1988 | Tsunoda et al. | 364/557 |
| 4,762,463 | 8/1988 | Yang | 416/61 |
| 4,768,926 | 9/1988 | Gilbert, Jr. | 416/61 |

(List continued on next page.)

OTHER PUBLICATIONS

Techmaster Ceiling Fan and Light Controls, published 1981.
Emerson 1895 Series "Masterpiece Edition" Programmabe Remote Control Ceiling Fan Owners Manual, Published Oct. 1986.
Hunter Three Speed Rotary Speed Control Model 22691 Instructions, Published Nov. 1987.
"Comfort–Touch: *Coming Soon from Casablanca*", Casablanca Sales Release, Inside Casablanca, published before Jan. 1990.

*Primary Examiner*—Brian Zimmerman
*Assistant Examiner*—Edwin C. Holloway, III
*Attorney, Agent, or Firm*—Baker & Botts, L.L.P.

[57] ABSTRACT

A remote control for operating a combination ceiling fan and light fixture features a system for communicating command signals to a fan mounted controls over an existing load line. A remote control features two switches for control of a ceiling fan and associated light fixture. Each switch connects a different Zener diode into the load line to produce a fixed predetermined voltage drop. A control mounted in the ceiling fan detects these voltage drops and controls fan speed and light intensity accordingly. The remote control and the fan mounted control communicate over the 60 Hz power line between the remote control and the ceiling fan. The remote control connects in series with the load line of the ceiling fan.

8 Claims, 8 Drawing Sheets

U.S. PATENT DOCUMENTS

| | | | |
|---|---|---|---|
| 4,799,176 | 1/1989 | Cacciatore | 364/557 |
| 4,818,920 | 4/1989 | Jacob | 318/16 |
| 4,819,714 | 4/1989 | Otsuka et al. | 165/12 |
| 4,885,803 | 12/1989 | Hermann et al. | 340/825.72 |
| 4,896,083 | 1/1990 | Kopala et al. | 340/310 R |
| 4,990,908 | 2/1991 | Tung | 340/310 R |
| 4,992,709 | 2/1991 | Griffin | 318/249 |
| 5,041,825 | 8/1991 | Hart et al. | 340/825.06 |
| 5,053,884 | 10/1991 | Kamijyo | 358/349 |
| 5,189,412 | 2/1993 | Mehta et al. | 340/825.22 |

REMOTE CONTROL FOR A CEILING FAN

RELATED APPLICATIONS

This application is a continuation of application Ser. No. 07/883,575, filed May 15, 1992, now abandoned.

The subject matter of this application is related to U. S. Pat. No. 5,189,412, which was filed on Sep. 11, 1990 having application Ser. No. 07/629,091 and which is assigned to the same assignee as the present application.

BACKGROUND OF THE INVENTION

1. Field of the Invention

The present invention is directed to a remote control for a combined ceiling fan and light fixture. Specifically, the present invention is directed to a remote control which may be used as a replacement for an existing wall switch and provide for control of the ceiling fan and accompanying light fixture without any modification to the existing electrical wiring between the wall switch and the light fixture.

2. Description of the Prior Art

Ceiling fans known in the prior art provide for a variety of desired features. Specifically, modem ceiling fans may be controlled to operate at a plurality of different speeds from a relatively low speed to a high maximum speed. Low speeds may be desirable to provide for general air circulation and to eliminate "hot" or "cold" spots within a room. Higher speeds may be desirable for cooling effects (in summer) or to eliminate temperature gradients (in winter). In addition, the direction of rotation may generally be controlled to be in either one of two opposite directions. In the winter, it is generally desirable to have the fan turn in one direction to circulate hot air away from the ceiling. In the summer, it may be desirable to have the fan turn in the opposite direction to provide a cooling effect on the occupants in the room.

Ceiling fans are often combined with a light fixture or fixtures with the intensity level of the light fixture(s) controlled from low levels to maximum high levels. Most ceiling fans are designed so that they may be installed in existing ceiling junction boxes, replacing existing light fixtures. In such an installation, shown in FIG. 1, there is generally a wall switch 101 switching load line 102 from A.C. supply voltage 170 in the house. Switched load line 103 and neutral line 104 from A.C. supply voltage 170 terminate in a ceiling junction box 105. A ceiling fan 120 comprising fan 106 with light fixture 180 is typically installed attached to junction box 105 in a similar manner as a standard light fixture. Because ceiling fan 120 must be adaptable to existing wiring in the house, fan speed switch 107, fan direction switch 108, and light intensity switch 109 are usually mounted on a housing attached to ceiling fan 120 itself.

Fan mounted switches 107, 108, and 109 may be preset to the desired levels of speed, direction, and light intensity, respectively, and wail switch 101 used to turn fan 106 and light fixture 180 to these preset levels. The disadvantage of such an approach is that each time the user wishes to change the existing levels, a switch must be changed at ceiling fan 120. For example, during the daytime, it may be desirable to run fan 106 at a high speed and shut off light fixture 180 in order to cool the house. In the evening, it may be desirable to run fan 106 at a medium speed and turn light fixture 180 on to maintain an even temperature throughout the house and to provide illumination, respectively. At night, it may be desirable to run fan 106 at low speed and turn light fixture 180 off to maintain air circulation with a minimum of noise. If ceiling fan 120 is located at a sufficient distance above the floor, it may be necessary to use a step stool or ladder in order to reach fan mounted switches 107, 108, and 109 in order to change the speed or direction of fan 106 or the intensity of light fixture 180. Alternately, long pull chains may be attached to fan mounted switches 107, 108 and 109 to allow the user to reach the switches. Such long pull chains are not aesthetically pleasing, however, and suffer the additional disadvantage of lowering clearance for taller occupants. Further, the plurality of pull chains are difficult to distinguish from one another (e.g., light vrs. speed vrs. direction). Finally, pull chains can be very difficult to operate, especially with regard to speed control, as the fan has a certain amount of inertia, making it difficult for the user to immediately determine whether the proper speed has been selected.

One way to overcome the disadvantages of the installation of FIG. 1 would be to install separate circuits to individual wall mounted switches for the fan speed and lighting control as shown in FIG. 1.A. In FIG. 1.A., the wall switch 101 of FIG. 1 has been replaced by a separate light switch 101a and fan switch 101b. Load line 103 of FIG. 1 has been replaced with light load line 103a and fan load line 103b. In the installation of FIG. 1.A., both the fan and light fixture can be turned on or off from the wall mounted switches 101a and 101b. While such an installation may be practical in new construction, in an existing home it would be necessary to remove portions of the ceiling and walls to run the additional wiring. In addition, in either new or existing construction, running additional wires involves additional expense and in some localities may require the services of a licensed electrician. Further, many ceiling fans are sold as owner-installed units with an easy to use installation kit. The complexities of house wiring are beyond the capabilities of most "do-it-yourselfers" and the length of wiring in each installation would be different, adding expense to the installation kit. Finally, despite the high cost of the installation shown in FIG. 1.A., the device provides for only a simple on-off control of both the fan 106 and light fixture 180. Remote fan speed, light intensity, and fan direction control cannot be provided in the installation shown in FIG. 1.A. unless extra components are installed with switches 101a and 101b.

One prior art device which has been used to provide a partial solution to the above described problem of remotely controlling the operation of ceiling fan is shown in U.S. Pat. No. 4,413,211 issued Nov. 1, 1983 to Fowler. This prior an Patent is directed towards a remote load selector which uses an existing wall switch to control a load by toggling the existing switch to provide for the selective application of power to multiple loads such as a combined ceiling fan and light fixture. The Fowler '211 device has a number of limitations due to the fact that the user must apply power by manually toggling the wall switch. For instance, the user may become confused as to which level the fan was previously switched to, making control difficult. In addition, the prior art load selector described above is generally limited in the number of control steps that can be realistically accomplished by the application and removal of power to the loads. For example, a typical ceiling fan may have three speeds in two separate directions, making a total of six different combinations of toggled signals that may be sent. If a light fixture is added to the fan, the number of combinations may be doubled to twelve. If the light fixture has more than one intensity setting, or if additional fan speeds are desired, the number of toggled combinations expands geometrically. The user may find himself toggling the wall switch repeatedly trying to find the proper combination of light intensity, fan speed, and fan direction.

A further prior art device which provides a partial solution to the above described problem of remotely controlling the operation of ceiling fan is disclosed in Fowler U.S. Pat. No. 4,465,956, issued Aug. 14, 1984. FIGS. 2 and 2.A. show a simplified schematic and waveforms of the Fowler '956 invention. Fowler '956 discloses a technique for controlling a ceiling fan and light fixture using a technique known as the diode method. In the Fowler '956 device, wall switch 101 of FIG. 1 is replaced with wall mounted remote control 211 containing light switch 201a, fan switch 201b, diode D1 and diode D2. In the diode method, A.C. supply voltage 270 to fan mounted control unit 210 is momentarily rectified by wall mounted remote control 211. The rectified wave in one direction is treated as one signal while the rectified wave in the other direction is treated as another signal.

In normal operation, as shown in FIG. 2, both light switch 201a and fan switch 201b are closed, and no diode is in the circuit. Light switch 201a and fan switch 201b are both momentary contact spring release type switches which are normally closed (NC). In normal operation, the load current passing from load line 202 to switched load line 203 passes through switches 201a and 201b, bypassing diodes D1 and D2 and producing a normal AC waveform 222 (FIG. 2.A.) on switched load line 203.

When fan switch 201b is pressed, diode D2 is switched into the circuit, momentarily rectifying A.C. supply voltage 270 to the positive half of the A.C. waveform as shown by waveform 223 in FIG. 2.A. Fan mounted control unit 210 detects positive rectified waveform 223 and treats it as a fan control signal. Fan mounted control unit 210 may either alter fan speed or direction, or turn fan 206 on or off. Typically, fan mounted control unit 210 will control the fan so that each successive fan control signal received will cycle the fan through a predetermined control pattern (e.g., low, medium, high, off).

Similarly, by pressing light control switch 201a, diode D2 will be placed in the circuit and the A.C. supply voltage 270 will be momentarily rectified in the negative direction to produce waveform 224 as shown in FIG. 2.A. Fan mounted control 210 will interpret waveform 224 as a light control signal and control light fixture 230 accordingly (e.g., low, medium, high, off).

The Fowler '956 device of FIG. 2 will provide an effective wall mounted remote control for a ceiling fan using existing wiring, however, the apparatus does suffer from some drawbacks. For example, momentary interruptions in the A.C. supply voltage 270 caused by the power company could be interpreted by fan mounted control 210 as command signals, erroneously switching fan 206 or light fixture 230 on or off. Such erroneous switching would be undesirable, for example, at night when it is desired to leave light fixture 230 off. Similarly, when a home is not occupied, if a momentary interruption in A.C. supply voltage 270 occurs, fan 206 or light 230 may switch on, wasting energy.

Another prior art device which attempts to provide a partial solution to the above described problem of remotely controlling a ceiling fan is disclosed in Hart U.S. Pat. No. 4,719,446, issued Jan. 12, 1988. FIGS. 3 and 3.A. show a simplified schematic and waveform, respectively, of the Hart '446 invention. Hart discloses a technique for controlling a ceiling fan and light fixture using a technique known as the phase control method. In the Hart device, wall switch 101 of FIG. 1 is replaced with a wall mounted remote control 311 containing light switch 301a, fan switch 301b, diode D3, diode D4, resistor R1, capacitor C1 and triac Q1. In the phase control method, pan of normal waveform 322 (FIG. 3.A.) of A.C. supply voltage 370 to fan mounted control unit 310 is momentarily interrupted by wall mounted remote control 311. If the interruption is in the positive side of the waveform, as shown in waveform 323 in FIG. 3.A., it is treated as one signal. If the interruption is on the negative side, as shown in waveform 324 in FIG. 3.A., it is treated as another signal. In normal operation, as shown in FIG. 3, both light switch 301a and fan switch 301b are closed, and no diode is in the circuit. Light switch 301a and fan switch 301b are both momentary contact spring release type switches which are normally closed (NC). In normal operation, the load current passing from load line 302 to switched load line 303 passes through switches 301a and 301b, bypassing diodes D3 and D4 and triac Q1 producing a normal AC waveform 322 on switched load line 303.

When fan switch 301b is pressed, diode D4 is switched into the circuit, blocking the positive half of the waveform of A.C. supply voltage 370. Resistor R1 and capacitor C1 form an RC timing network to delay the firing of triac Q1 such that the positive half of the waveform of A.C. supply voltage 370 is delayed by a preset amount producing waveform 323 as shown in FIG. 3.A. Fan mounted control unit 310 detects this delay and treats it as a fan control signal. Fan mounted control unit 310 my either alter fan speed or direction, or turn fan 306 on or off. Typically, Fan mounted Control unit 310 will control the fan so that each successive fan successive control signal will cycle the fan through a predetermined control pattern (e.g., low, medium, high, off).

Similarly, by pressing light control switch 301a, diode D3 will be placed in the circuit, blocking the negative portion of the waveform of the A.C. supply voltage 370 and allowing triac Q1 to delay the negative portion of the waveform of the A.C. supply voltage 370 by a predetermined amount to produce waveform 324 as shown in FIG. 3.A. Fan mounted control 310 will interpret this signal as a light control signal and control light fixture 330 accordingly (e.g., low, medium, high, off).

The Hart device of FIG. 3 will provide an effective wall mounted remote control for a ceiling fan using existing wiring, however, the apparatus does suffer from some drawbacks. For example, momentary interruptions in the A.C. supply voltage 370 or noise spikes caused by switching inductive loads (e.g., electric motors) could be interpreted by fan mounted control 310 as command signals, erroneously switching fan 306 or light fixture 330 on or off. Further, the Hart device of FIG. 3, like the Fowler device of FIG. 2, can only provide for two signal levels (e.g., fan and light) on the A.C. waveform. If a further number of signals are desired, a more sophisticated receiving and transmitting circuit would have to be constructed.

One apparatus which attempts to overcome the deficiencies of both the Hart and Fowler devices is that shown Fowler U.S. Pat. No. 4,439,576. FIGS. 4 and 4.A. shows a simplified schematic and waveform, respectively, of the Fowler '576 invention. Fowler discloses a technique for controlling a ceiling and light fixture using a technique known as the proportional voltage drop method. In the Fowler '576 device, wall switch 101 of FIG. 1 is replaced with a wall mounted remote control 411 containing light switch 401a, fan switch 401b, resistor R1 and resistor R2. Further switches and resistors may be employed to provide additional levels of control, however, for the sake of illustration, the apparatus is shown here with two switches and two resistors.

In the proportional voltage drop method, part of normal waveform 422 (FIG. 4.A.) of the A.C. supply voltage 470 having peak voltage V1 (typically 170 volts for a 120 V.A.C. system) is transmitted to fan mounted control unit 410 over control line 403a and is proportionally dropped from its peak voltage by wall mounted remote control 411. If the voltage drop is at a first level V2 as shown in waveform 423 in FIG. 4.A., it is treated as one signal. If the voltage drop is at a second level V3 as shown in waveform 424 in FIG. 4.A., waveform 424 is treated as another signal. In normal operation, as shown in FIG. 4, both light switch 401a and fan switch 401b are open, and no resistor is in the circuit. Light switch 401a and fan switch 401b are both momentary contact spring release type switches which are normally open (NO). In normal operation, the load current passes from load line 402 to fan mounted control unit 410, bypassing switches 401a and 401b, to produce a normal AC waveform 422 on load line 402 and no output on control line 403a.

When fan switch 401b is pressed, resistor R2 is switched into the circuit, from the A.C. supply voltage 470, producing a proportional voltage drop on control line 403a shown as waveform 423 as shown in FIG. 4.A. Fan mounted control unit 410 compares this voltage to the A.C. supply voltage 470 from load line 402 and treats it as a fan control signal. Fan mounted control unit 410 my either alter fan speed or direction, or turn fan 406 on or off. Typically, Fan mounted Control unit 410 will control the fan so that each successive fan successive control signal will cycle the fan through a predetermined control pattern (e.g., low, medium, high, off).

Similarly, by pressing light control switch 401a, resistor R1 will be placed in the circuit, producing a different proportional voltage drop of the A.C. supply voltage 470 on control line 403a shown as waveform 424 as shown in FIG. 4.A. Fan mounted control 410 will interpret this signal as a light control signal and control light fixture 430 accordingly (e.g., low, medium, high, off).

In the Fowler '576 invention, if the resistors are selected for a 120 V line voltage and the supply voltage changes, say to 110 V, the control signals will change proportionally. Without additional circuitry to sense the change in supply voltage, the new signal may not represent the correct control signal and may trigger the load incorrectly. Fowler attempts to minimize the effect of variations in line voltage by utilizing unregulated voltage to pre-bias the sensing network.

In order to pre-bias the sensing network, however, the Fowler '576 invention requires the use of three wires as input to the fan mounted control. Thus, the two wires at an existing wall switch would require rewiring, and these two wires would no longer be in series with load. As discussed above, one of the critical criteria for a remote control for a ceiling fan is that it be installed using existing wiring. In addition, since the proportional voltage drops in the Fowler '576 device are produced by resistive devices, the amount of voltage drop will be proportional to the current passing through the resistors. If more current passes through the resistors, the voltage drop will increase proportionally, possibly causing a loss of control.

Further, in the Fowler '576 device, the power to the appliance does not pass through the remote control per se, as the remote control is wired in parallel with the appliance rather than in series with the appliance. Thus, the remote control is not provided with any means of shutting off all power to the appliance (i.e., main cutoff switch). Such a power cutoff is desirable in order to satisfy electrical codes as well as to provide the user with a positive means for turning off all power to the appliance. In order to provide a power cutoff switch to the Fowler '576 device, load line 402 would have to be run through the remote control and an additional load rated switch installed.

In view of the deficiencies of the above prior art devices, it remains a requirement in the art to provide an inexpensive remote control for a ceiling fan which can be easily installed using existing wiring, and provide for easy to use and reliable control of fan speed and light intensity.

SUMMARY OF THE INVENTION

Therefore it is an object of the present invention to provide a remote control for a ceiling fan.

It is a further object of the present invention to provide a remote control for a ceiling fan which can communicate with a fan mounted control through the power wiring to the fan.

It is a further object of the present invention to provide a remote control for a ceiling fan which can be installed using existing house wiring.

It is a further object of the present invention to provide a remote control for a ceiling fan which can be easily operated by the user.

It is a further object of the present invention to provide a method of transmitting signals between a remote control and a ceiling fan which is relatively immune from line noise and momentary power interruptions.

It is yet a further object of the present invention to provide a remote control for a ceiling fan which can provide two or more control signals to a fan mounted control unit.

It is yet a further object of the present invention to provide a remote control for a ceiling fan which does not require an active device in the load line except during signaling.

The foregoing objects, as well as others which are to become apparent from the text below, are achieved in a remote control for a ceiling fan by providing a remote control which communicates over a switched A.C. load line with a control mounted in the ceiling fan itself. The remote control features two switches for controlling a ceiling fan and associated light fixture. Each switch connects a different Zener diode into the load line to produce a fixed, predetermined voltage drop. A control mounted in the ceiling fan detects these voltage drops and controls fan speed and light intensity accordingly. The remote control connects in series with the load line of the ceiling fan.

These and other objects of the present invention will be better understood from the following detailed description of the preferred embodiment of the invention, taken in conjunction with the accompanying drawings in which similar elements in different Figures are assigned the same last two digits in their reference numeral (i.e.—fan 106 of FIG. 1 and fan 206 of FIG. 2).

BRIEF DESCRIPTION OF THE DRAWINGS

FIG. 1.A. illustrates an installation of a prior art ceiling fan separate wiring circuits for fan and light.

FIG. 2.A. shows the waveforms generated by the control of FIG. 2.

FIG. 3.A. shows the waveforms generated by the control of FIG. 3.

FIG. 4.A. shows the waveforms generated by the control of FIG. 4.

FIG. 5.A. shows the waveforms generated by the control of FIG. 5.

FIG. 5.B. shows another embodiment of the remote control shown in FIG. 5.

DETAILED DESCRIPTION

Figure 1:
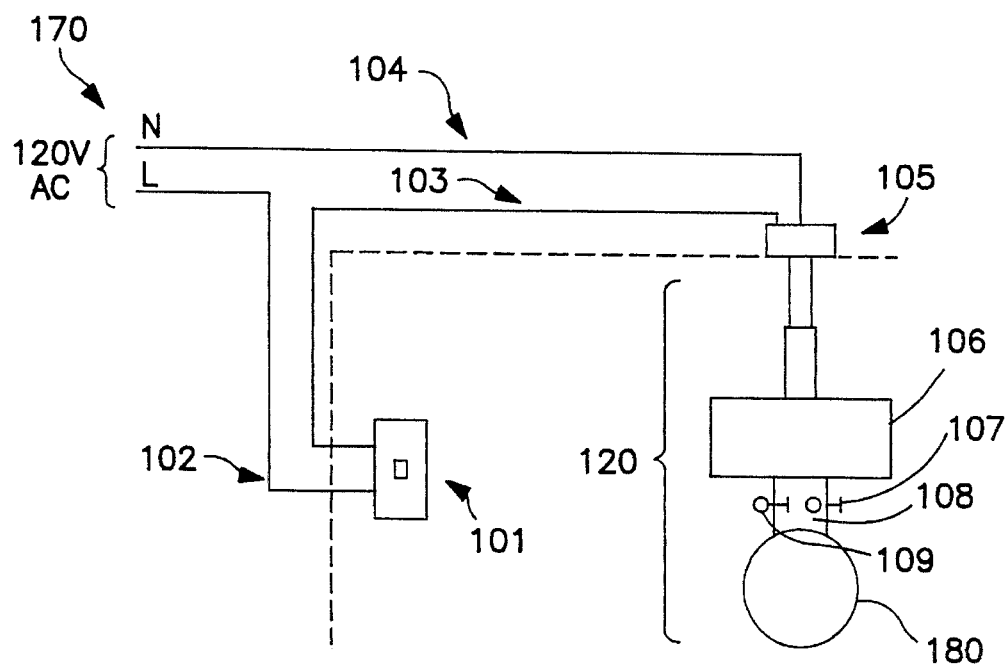
FIG. 1 shows the installation of a prior art ceiling fan using existing house wiring.
Figure 1A:
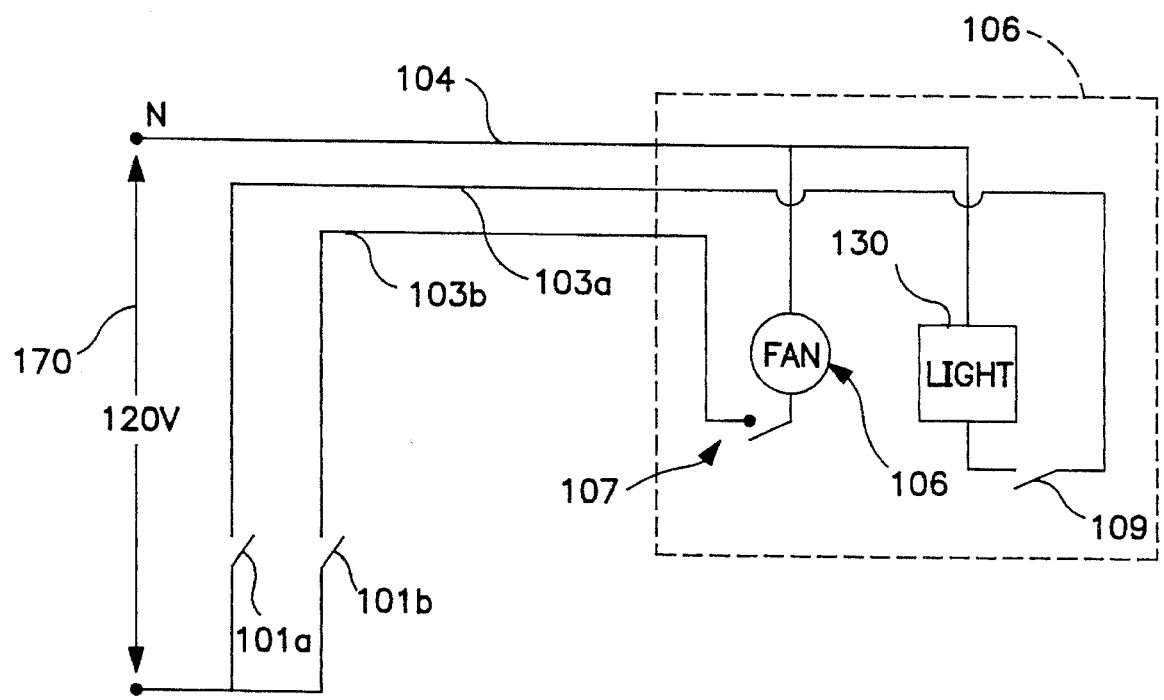
Figure 2:
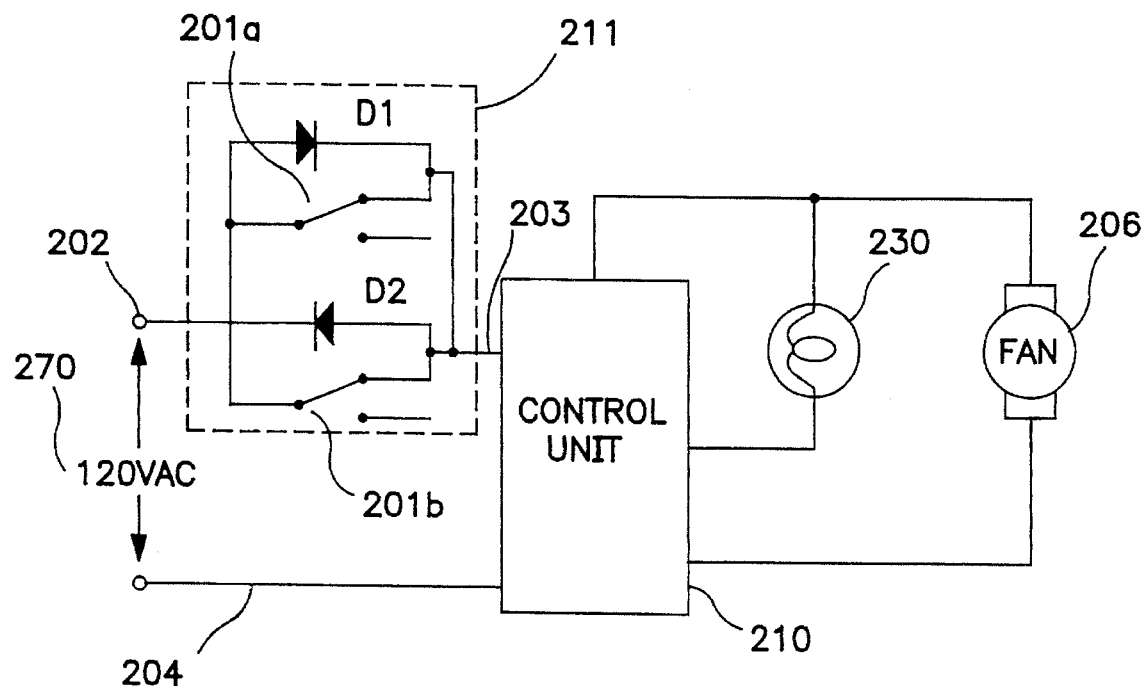
FIG. 2 shows the prior art diode type control for a ceiling fan.
Figure 2A:
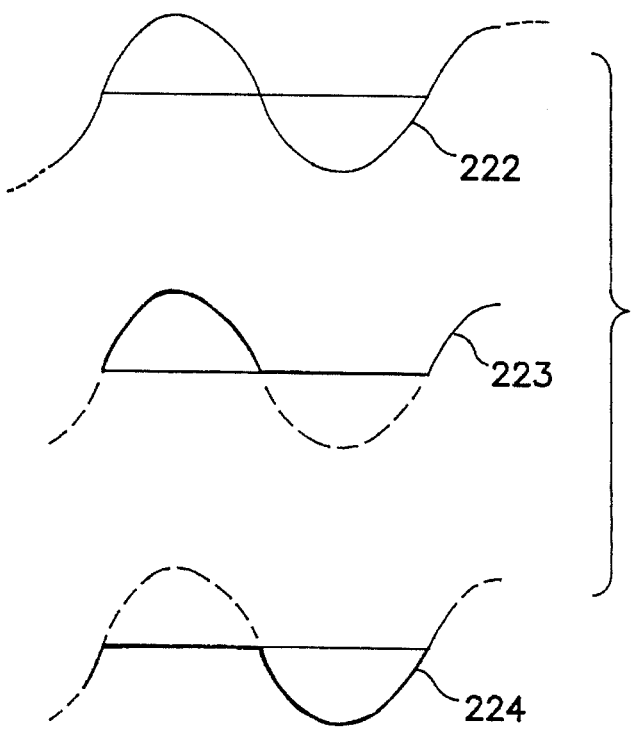
Figure 3:
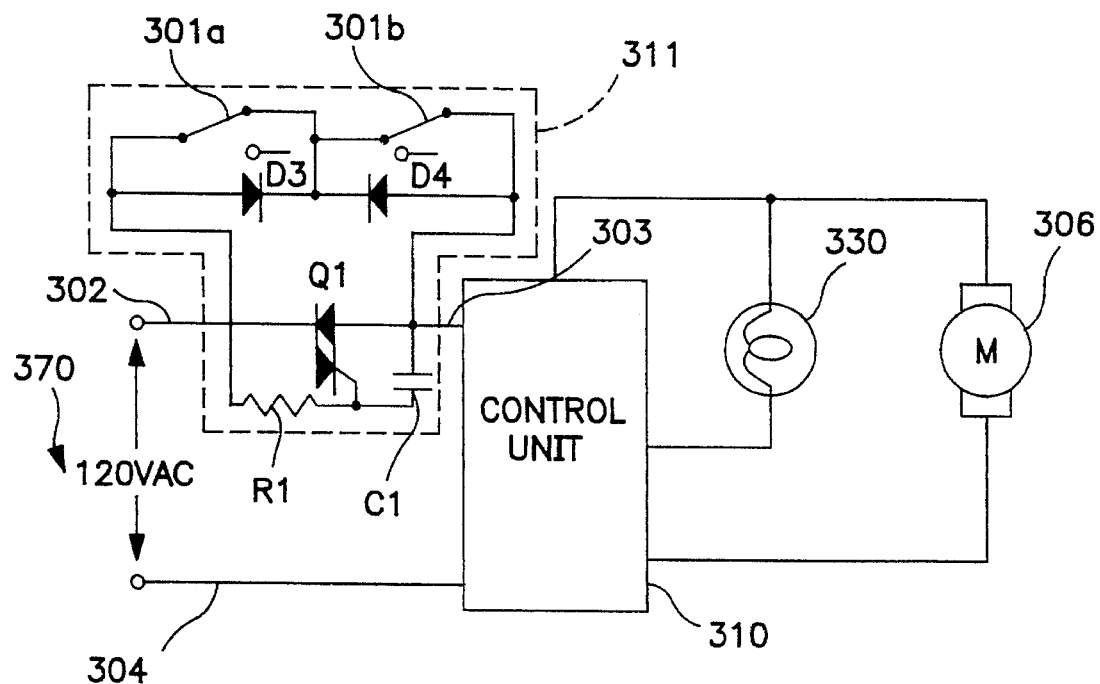
FIG. 3 shows the prior art phase control type control for a ceiling fan.
Figure 3A:
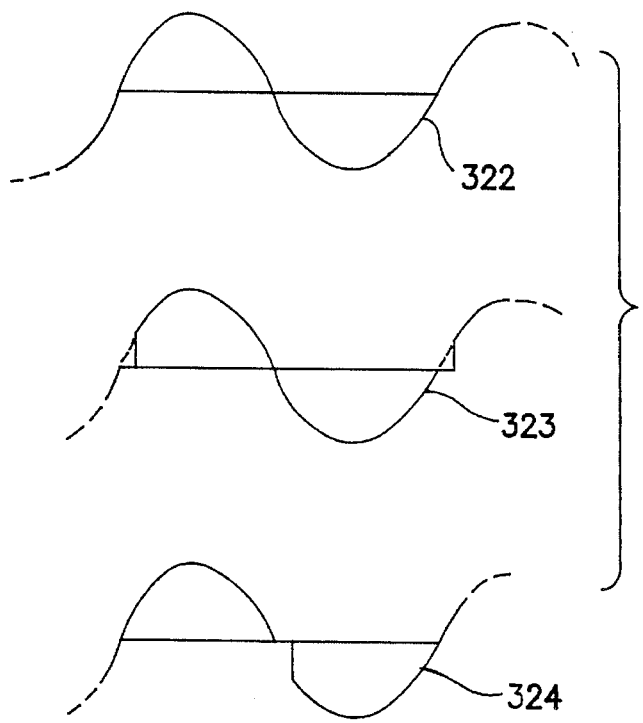
Figure 4:
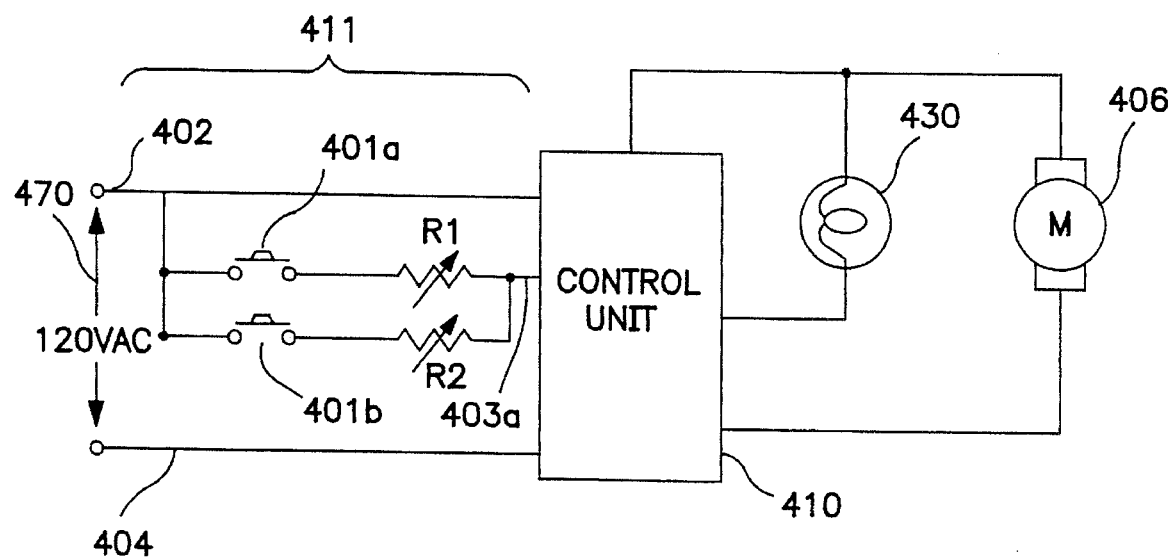
FIG. 4 shows the prior art proportional voltage drop type control for a ceiling fan.
Figure 4A:
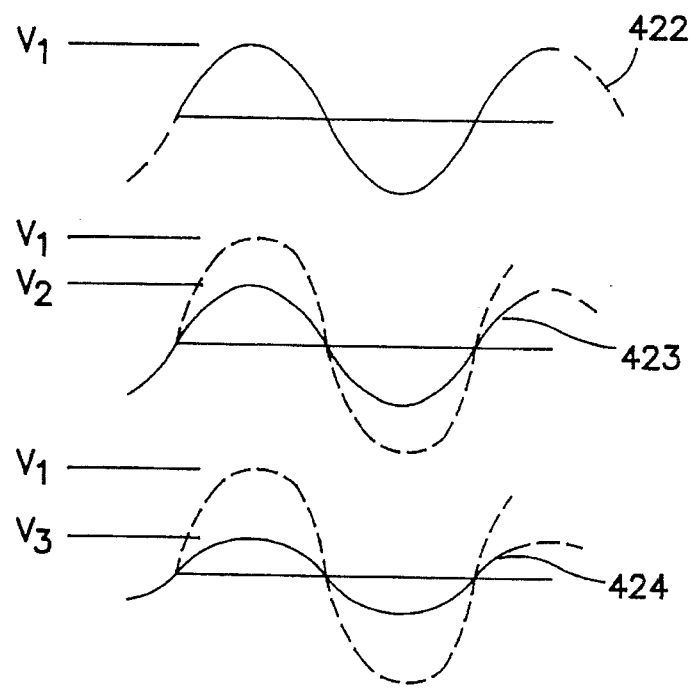
Figure 5:
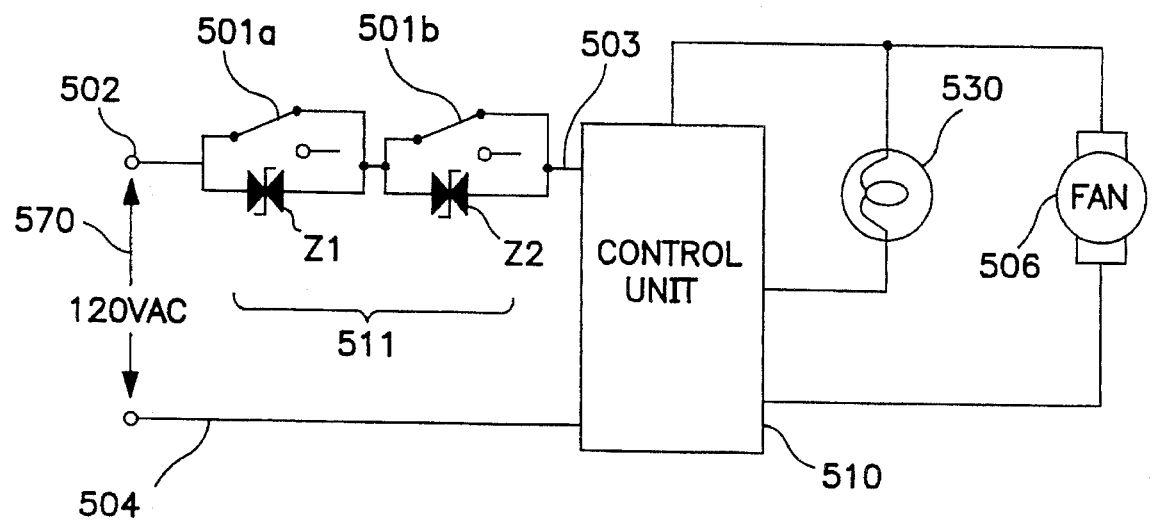
FIG. 5 shows the control for a ceiling fan of the present invention.
Figure 5A:
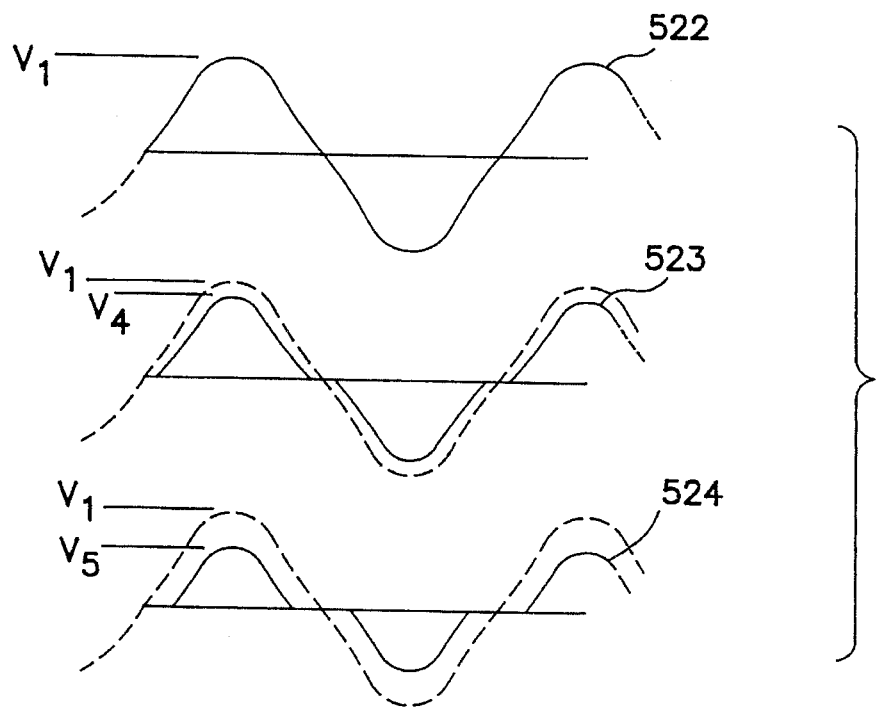

Referring now to FIGS. 5 and 5.A., wall switch 101 of FIG. 1 may be replaced with remote control 511. Remote control 511 may be designed to fit into and cover a typical wall switch box. Remote control 511 draws power from load line 502 which runs from A.C. supply voltage 570 through remote control 511 and switched load line 503 to fan mounted control 510. Wall mounted remote control 511 contains light switch 501a, fan switch 501b, Zener diode Z1 and Zener diode Z2.

In the present invention, part of the normal waveform 522 (FIG. 5.A.) of the A.C. supply voltage 570 having peak voltage V1 (typically 170 volts for a 120 V.A.C. system) is transmitted to fan mounted control unit 510 over switched load line 503 and is momentarily dropped from its peak voltage by wall mounted remote control 511. If the voltage drop is at a first level V4 as shown in waveform 523 in FIG. 5.A., it is treated as one signal. If the voltage drop is at a second level V5 as shown in waveform 524 in FIG. 5.A., waveform 524 is treated as another signal. In normal operation, as shown in FIG. 5, both light switch 501a and fan switch 501b are closed, and no Zener diode in the circuit. Light switch 501a and fan switch 501b are both momentary contact spring release type switches which are normally closed (NC). In normal operation, the load current passing from load line 502 to switched load line 503 passes through switches 501a and 501b, to produce a normal AC waveform 522 on switched load line 503.

When fan switch 501b is pressed, Zener diode Z2 is switched into the circuit, from A.C. supply voltage 570, producing a fixed voltage drop on control line 503 shown as waveform 523 in FIG. 5.A. Fan mounted control unit 510 detects waveform 523 by comparing voltage V4 to peak A.C. supply voltage V1 and treats the detected signal as a fan control signal. Fan mounted control unit 510 may either alter fan speed or direction, or turn fan 506 on or off. Typically, Fan mounted Control unit 510 will control the fan so that each successive fan successive control signal will cycle the fan through a predetermined control pattern (e.g., low, medium, high, off).

Similarly, by pressing light control switch 501a, Zener diode Z1 will be placed in the circuit, producing a different fixed voltage drop of A.C. supply voltage 570 on control line 503 shown as waveform 524 in FIG. 5.A. Fan mounted control 510 detects waveform 524 by comparing peak voltage V5 to peak A.C. supply voltage V1 and will interpret the signal as a light control signal and control light fixture 530 accordingly (e.g., low, medium, high, off). Although not shown in FIG. 5, an additional slide type switch 515 may be provided in remote control 511 to cutoff all power to both the ceiling fan and remote control.

In the present invention, the entire A.C. waveform is used to generate a control signal. There is no positive or negative signal such as that used by Hart '446 or Fowler '956. There is no phase control or wave rectification. Instead, the control signal is based upon fixed reference voltage drops at the transmitter. A voltage drop of V4 is treated as one signal and a voltage drop of V5 is treated as another signal.

For Example, as shown in FIG. 5.A., the power supply voltage 522 is 120 V.A.C. or a peak voltage V1 of 170 Volts. When light switch 501a is pressed momentarily, Zener diode Z1 is switched into the circuit. Zener diode Z1 may have a fixed Zener voltage of, for example, 18 Volts. As such, when light switch 501a is momentarily pressed, a fixed voltage drop of 18 Volts occurs and the waveform 522 is reshaped as shown in waveform 523 is FIG. 5.A., dropping peak voltage V1 from 170 Volts to a voltage V4 of approximately 152 Volts.

Similarly when fan switch 501b is pressed momentarily, Zener diode Z2 is switched into the circuit. Zener diode Z2 may have a fixed Zener voltage of, for example, 33 Volts. In the preferred embodiment, Zener diodes Z1 and Z2 have different Zener voltage values, so that fan mounted control 510 can distinguish between the two signals. Thus, when fan switch 501b is momentarily pressed, a fixed voltage drop of 33 Volts occurs and the waveform 522 is reshaped as shown in waveform 524 is FIG. 5.A.

Of course, the two values of 18 Volts and 33 Volts are shown here by way of example only. Other Zener values may be used to produce other fixed voltage drops which may be detected by the fan mounted control 510. Similarly, since the two Zener diodes are shown here in series, if both fan switch 501b and light switch 501a are pressed simultaneously, a third fixed voltage drop may be produced to produce a third distinct control signal (e.g., fan direction). Further, although only two switches and two Zener diodes are shown, further switches and further Zener diodes may be used to provide additional levels of control. Appropriate changes can be made at the receiver to sense these additional control signals.

There are two things to be noted here. First, the new waveform is deformed such that the peak is reduced and the amplitude is dropped by 18 Volts or 33 volts. This may appear to be somewhat similar to the series resistance used by Fowler '576, however in the Fowler '576 design, the waveform remains sinusoidal. Second, in the present invention, the voltage drop always remains a fixed value, no matter what the A.C. supply voltage or load current is (within maximum rating). Unlike the series resistance of Fowler '576, the voltage drop remains fixed regardless of peak voltage V1 or current load. This distinction allows the control of the present invention to be installed in an existing wall mounted switch box 555 (FIG. 6) using existing load and neutral lines 502 and 504 respectively. In contrast, the Fowler '576 device, which relies on measuring proportional voltage, requires the use of three lines; a load line, a neutral line, and a control line. The series resistance method of Fowler '576 requires these three lines as the normal A.C. supply voltage 570 in a typical household may vary more than ±10% (e.g., from 90 to 120 Volts). As such, a simple passive resistor would produce a different voltage drop depending on peak voltage and the load current, both of which would vary over time.

FIG. 5.B. shows a schematic of another embodiment of the remote control of FIG. 5.A. The schematic of FIG. 5.A. shows all of the load current to fan 516 and light 530 passing through Zener diodes Z1 or Z2 when either switches 501a or 501b is momentarily pressed. While such a design will produce the desired fixed voltage drops, all of the load of fan 506 and light 530 will pass through Zener diodes Z1 and Z2. As such, it would be necessary to size Zener diodes Z1 and Z2 to handle a large amount of current. To improve the design, in FIG. 5.B., Zener diodes Z1 and Z2 are used to bias transistor Q51 which is rated for high loads at intermittent use. In the example of FIG. 5.B., the value of Z2 is higher than Z1. (e.g., Z2=33 V, Z1=18 V).

Referring now to FIG. 5.B., during normal operation, switches 501b and one pole of switch 501a, both of which are spring release momentary contact type switches are closed. Here, switch 501a is a double pole double throw switch. One pole of switch 501a is normally closed and one pole of switch 501a is normally open. Main power cutoff switch 515 is provided to positively cutoff all power from remote control 511, fan mounted control 510, fan 506 and light 530. Such a switch is generally require to meet electrical code certification and in addition provides the user with a quick and certain way to turn off all power. In normal use, main power switch 515 is closed and current passes from load line 502 through the normally closed pole of switches 501a, through switch 501b to switched load line 503 and on to fan mounted control 510. In normal operation, the 120 V.A.C. power supply waveform is not disturbed as it passes through remote control 511.

When light switch 501a is pressed momentarily, current flow through the normally closed pole of switch 501a is interrupted. Current flowing in a positive direction (i.e., from load line 502 to switched load line 503) will pass from load line 502 through diode D52, through transistor Q51, diode D53 to switched load line 503. Some of this current will also pass through both Zener diodes Z1 and Z2 to bias transistor Q51 to a first predetermined voltage level determined by the values of Zener diodes Z1 and Z2. Since Z2 has a higher value than Z1, the voltage drop of Z1 will be overridden by the drop from Z2. The actual effective value will be Z2 although both Zener diodes Z1 and Z2 are in the circuit. Current flowing in a negative direction (i.e., from load line 503 to switched load line 502) will pass from switched load line 503 through diodes D54 and D55, through transistor Q51, diode D51 to load line 502. Some of this current will also pass through both Zener diodes Z1 and Z2 to bias transistor Q51 to the same first predetermined voltage level. Thus, the effect on the positive half and negative half of the waveform is the same. The resultant waveform on switched load line 503 would appear as waveform 523 as shown in FIG. 5.A.

When fan switch 501b is pressed momentarily, current flow through switch 501b is interrupted. Current flowing in a positive direction (i.e., from load line 502 to switched load line 503) will pass from load line 502 through diode D52, through transistor Q51, diode D53 to switched load line 503. Some of this current will also pass through Zener diode Z1 to bias transistor Q51 to a second predetermined voltage level determined by the values of Zener diode Z1. Current flowing in a negative direction (i.e., from load line 503 to switched load line 502) will pass from switched load line 503 through diodes D54, through transistor Q51, diode D51 to load line 502. Some of this current will also pass through both Zener diode Z1 to bias transistor Q51 to the same second predetermined voltage level. Thus, again, the effect on the positive half and negative half of the waveform is the same. The resultant waveform on switched load line 503 would appear as waveform 524 as shown in FIG. 5.A.

Figure 5B:
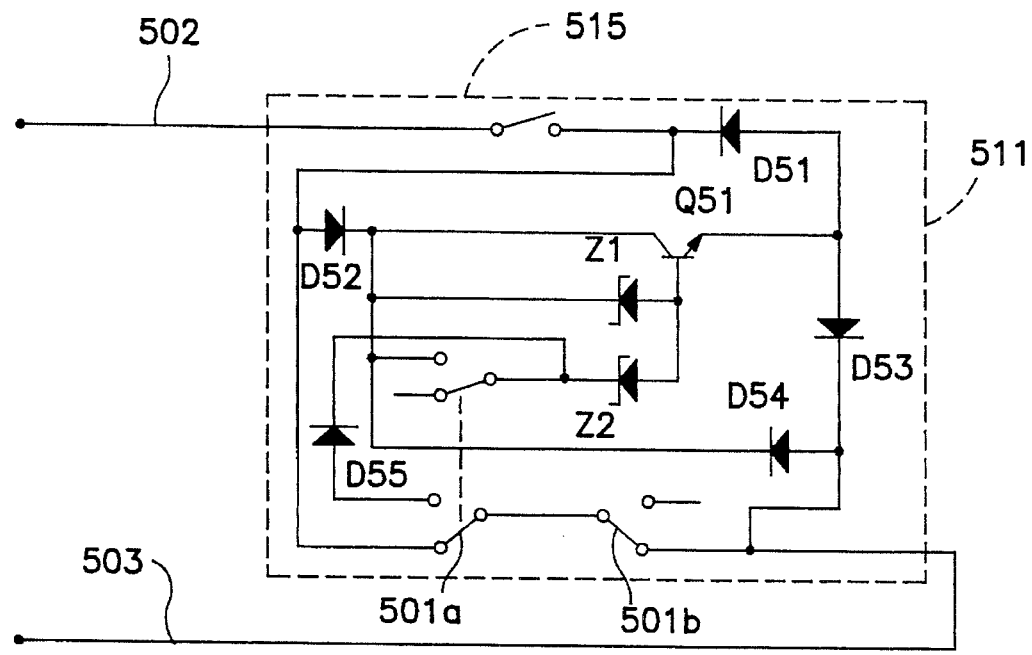

Of course the schematic shown in FIG. 5.B. is by way of example only. Many modifications to the schematic of FIG. 5B could be made without departing form the spirit of the invention. For example, a third switch and a third Zener diode (with a different Zener voltage value than Z1 and Z2) can be added to the circuit to provide a third fixed, predetermined voltage drop (e.g., for fan direction change). Similarly, additional switches and Zener diodes having different Zener voltage values could be added to provided additional voltage drops for additional control signals.

Figure 6:
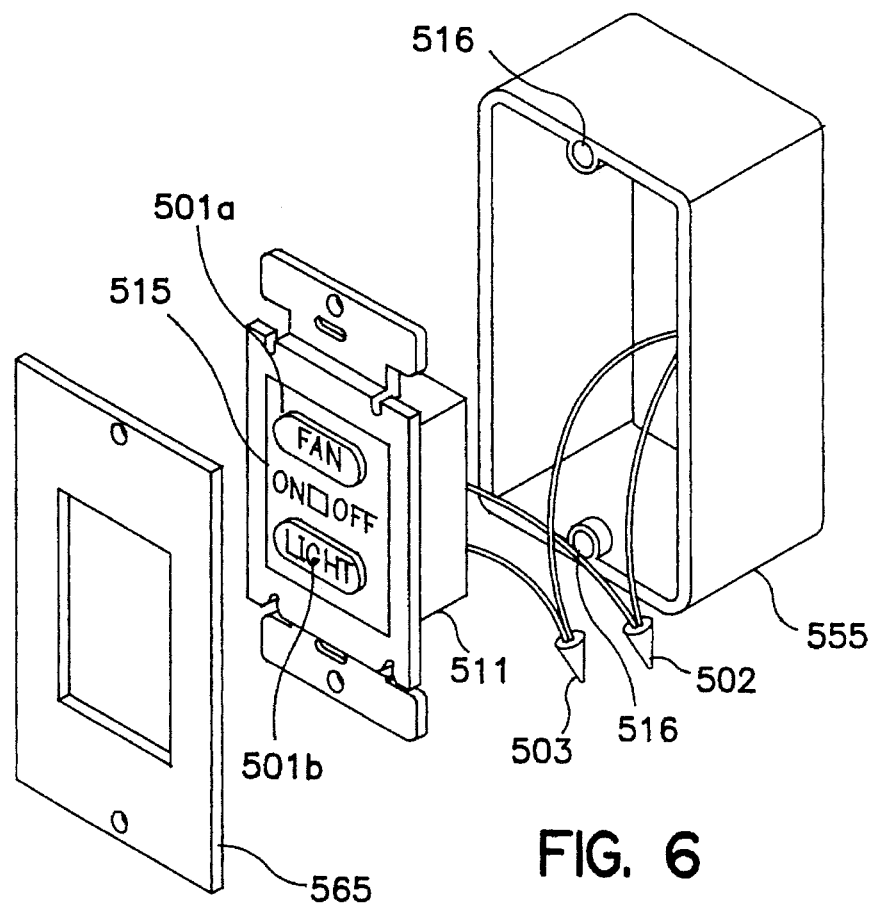
FIG. 6 shows a perspective view of the installation of the remote control of the present invention.
Figure 7:
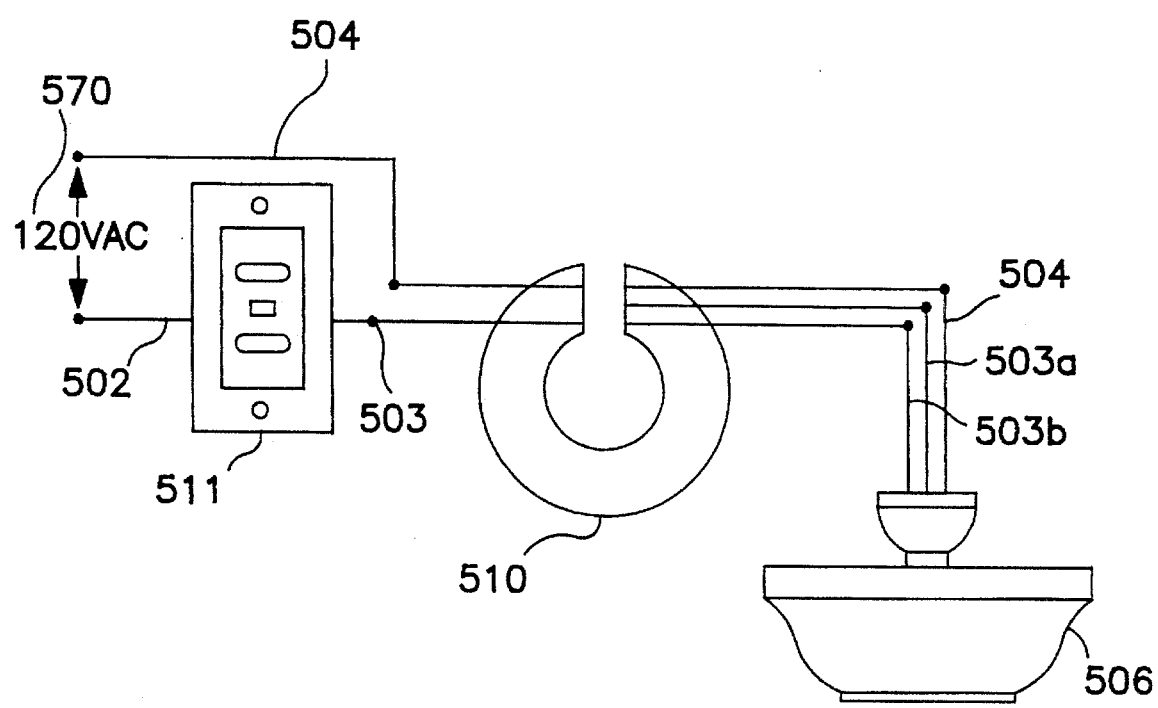
FIG. 7 shows the installation of the present invention.

FIGS. 6 and 7 illustrate the installation of the remote control of the present invention. FIG. 6 illustrates the installation of the remote control in a standard wall switch box 555. Remote control 511 may be designed to fit a standard wall switch box 555 using two screws threaded through screw holes 516 into wall switch box 555. Remote control 511 is connected to load line 502 and switched load line 503. No connection to neutral line 504 is necessary. Remote control 511 may have control switches 501a and 501b and a master power switch 515 for cutting off all power to ceiling fan 506 and light fixture 580. Remote control 511 may be designed to fit a standard modem wide opening (decor type) switch plate cover 565.

FIG. 7 shows the installation of the overall control. Remote control 511 is connected to load line 502 from A.C. supply voltage 570. Neutral line 504 from A.C. supply voltage 570 is connected directly to fan mounted control 510. Switched load line 503 from remote control 511 connects to fan mounted control 510. Fan mounted control 510 connects to fan 506 and light fixture 530 (not shown) via neutral line 504 and fan load line 503a and light load line 503b.

The term "fan mounted" as it applies to fan mounted control 510 is defined here to be mounted in the immediate vicinity of, and electrically connected to, a ceiling fan. Fan mounted control 510 may be built in to ceiling fan 506 at the factory, or may be an aftermarket accessory kit which may be installed by the user. Some examples of locations of fan mounted control 510 would be in the housing of ceiling fan 506, in a ceiling junction box, or in an module located between the housing of ceiling fan 506 and a ceiling junction box as in the device of Angott, discussed above. The fan mounted control 510 need not be physically mounted to ceiling fan 506.

Figure 8:
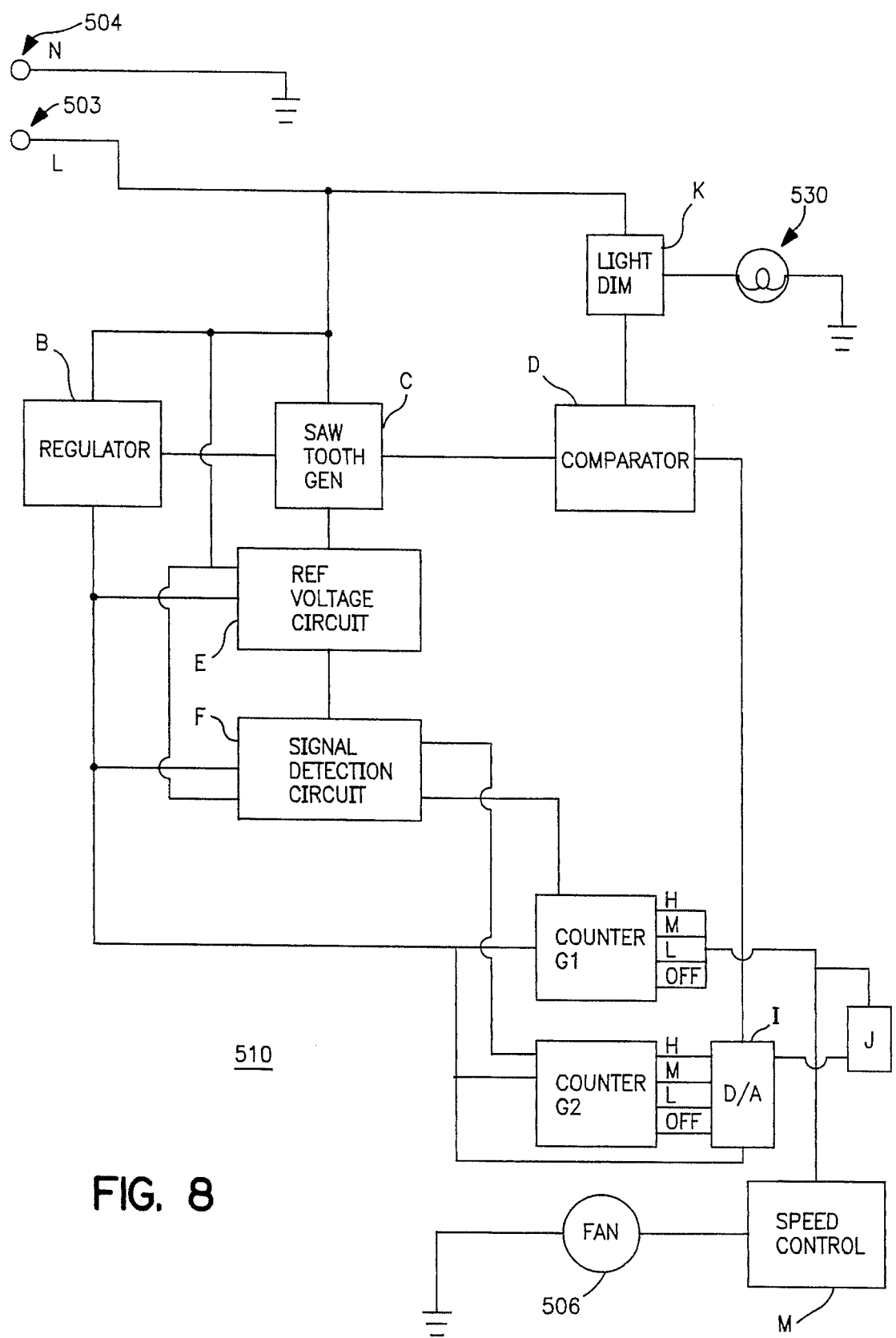
FIG. 8. shows a block diagram of the fan mounted control of the present invention.

FIG. 8 shows a simplified block diagram of the fan mounted control 510 of FIG. 5. Switched load line 503 and neutral line 504 feed into fan mounted control 510 through existing house wiring. Neutral line 504 is grounded to the fan housing. The various blocks shown in FIG. 8 may also be grounded to the fan housing as well, but for the sake of illustration, such ground connections are not shown.

Regulator B is a double regulator with two regulated outputs of 33 Volts and 5 Volts. Regulator B provides D.C. power for all of the remaining electrical components of fan mounted control 510. Reference voltage circuit E contains a current sensing Op-Amp to sense line voltage drop. The average peak voltage is stored as a reference voltage. By storing this peak voltage, the fan mounted control has a reference voltage with which to compare the control signals. Since the average peak line voltage is stored, the control is immune from variations in load line voltage (spikes or sags) and operates independently of load current.

Signal detection circuit F compares the line voltage from switched load line 503 to the reference voltage from reference voltage circuit E. When light button 501a is pressed, signal detection circuit F will detect the difference between the peak voltage 31 (FIG. 5.A.) stored in reference voltage circuit E and the voltage V4 (FIG. 5.A.) produced by remote control 510 on switched load line 503. If, on the other hand, fan switch 501b at remote control 511 is pressed, signal detection circuit F will detect the difference between the peak voltage V1 (FIG. 5.B.) stored in reference voltage circuit E and the voltage V5 (FIG. 5.B.) produced by remote control 510 on switched load line 503.

Signal detection circuit F will only detect these fixed voltage drops for durations of at least one tenth of a second. As such, transient voltage spikes or noise will be ignored. Similarly, since signal detection circuit is set to detect only fixed, predetermined voltage drops (within a narrow range) spurious noise or momentary switching of the load line 502 will not result in spurious commands. In response to a detected voltage signal, signal detection circuit F will output a pulse to either counter G1 or G2.

Counters G1 and G2 use the signals from signal detector F as a clock pulses to increment the counters. The output of the counters will thus cycle through a predetermined program of control levels with each successively received control signal. For example, counter G1 may cycle through a series of three fan speed controls (e.g., low, medium, high) as well as an "off" command. Similarly, counter G2 may cycle through a series of three or more light intensity levels (e.g., low, medium, high) as well as an "off" command.

Speed control H uses the output of one counter G1 via an amplifier to drive triacs to switch on different capacitors to control the speed of the fan. This type of capacitive control is well known in the art. By shunting different capacitors into the fan circuit, the overall impedance of the fan winding is changed, altering the fan speed. Although a capacitive type fan speed control is shown here, other types of fan speed controls may be substituted without departing from the spirit of the invention. For example, a phase control circuit could be used to control fan speed.

Sawtooth generator circuit C generates a 120 Hz signal from the 60 Hz power supply signal. This signal triggers an RC circuit within the sawtooth generator to generate a sawtooth waveform. This sawtooth waveform is used as a reference voltage for the comparator for the light dimmer. Such dimmer circuits are well known in the art. Digital to analog converter I takes the digital output of light counter G2 and converts the signal into an analog signal for comparator D in order to trigger the gate of the triac in light dimmer K. Comparator circuit D compares the reference voltage from the sawtooth generator with the output of a digital to analog converter I. Comparator D outputs a phase control signal voltage for the gate of a triac in light dimmer K. A different phase control signal will result in different light levels.

Buzzer J is connected to one of the outputs of counter G1 to confirm the control action taken by fan mounted control 510. Whenever there is change in the speed or level of illumination, buzzer J will sound. Buzzer J can be any type of audio tone generator and preferably generates a tone which is pleasing to the ear. Buzzer J may also be configured to provide a different audio tone (or a different duration of audio tone) for each different control level. Various schemes may be used. For example, different frequency tones may be used to distinguish between fan and light controls, with a different duration of each tone (or a different number of tones) to indicate level of control (e.g., low, medium, high).

Obviously, many modifications and variations of the present invention are possible in light of the above teachings. For example, although two Zener diodes and two control signal are shown, other numbers of Zener diodes and control signals may be used (greater or fewer). Further, although described in a ceiling fan embodiment, the remote control of the present invention has applications in controlling other household and industrial appliances. Further, the remote control of the present invention may be modified to control more than one appliance. For example, in a commercial embodiment, one control may be used to control a plurality of ceiling fans (i.e.—auditorium, restaurant, etc.). It is therefore, to be understood that within the scope of the appended claims the invention may be practiced otherwise than as specifically described.

What is claimed is:

1. A remote control for an appliance coupled to an A.C. load line producing a first full-wave A.C. power signal having a first peak voltage, said remote control comprising:

at least one signaling circuit comprising a zener diode and a switch, said zener diode and said switch connected in parallel, said signaling circuit operating to provide an output signal, said output signal comprising said first full-wave A.C. power signal when said switch is closed and a second full-wave A.C. power signal having a peak voltage less than said first peak voltage of said first full-wave A.C. power signal when said switch is open;

receiver means connected in series to and remotely located from said at least one signaling circuit for detecting said second full-wave A.C. power signal and said first full-wave A.C. power signal; and control means coupled to said receiver means for controlling a function of said appliance in response to the detection of said second full-wave A.C. power signal.

2. The remote control of claim 1 wherein said receiver means comprises:

a reference voltage circuit for storing a reference voltage A.C. power signal;

a signal detection circuit connected to said reference voltage circuit and said at least one signaling circuit for comparing the reference voltage A.C. power signal to said output signal and outputting a detection signal when said reference voltage A.C. power signal differs from said output signal; and at least one counter circuit connected to said signal detection circuit for counting detection signals and indicating detection of said second full-wave A.C. power signal to said control means.

3. A device for remotely controlling an appliance coupled to an A.C. load line producing a first full-wave A.C. power signal having a first peak voltage, said device comprising:

a main power switch connected to said A.C. load line, said first full-wave A.C. power signal being provided when said switch is closed;

at least one signaling circuit comprising a zener diode and a switch, said first full-wave A.C. power signal bypassing said zener diode when said switch is closed;

said zener diode producing a second full-wave A.C. power signal having a peak voltage less than said first peak voltage of said first A.C. power signal on said A.C. load line when said switch is open;

receiver means connected in series to and remotely located from said at least one signaling circuit for detecting said second full-wave A.C. power signal and said first full-wave A.C. power signal; and control means coupled to said sensing means for controlling a function of said appliance in response to the detection of said second full-wave A.C. power signal.

4. The remote control of claim 3 wherein said receiver means comprises:

a reference voltage circuit for storing a reference voltage A.C. power signal;

a signal detection circuit connected to said reference voltage circuit and said at least one signaling circuit for comparing the reference voltage A.C. power signal to said output signal and outputting a detection signal when said reference voltage A.C. power signal differs from said output signal; and at least one counter circuit connected to said signal detection circuit for counting detection signals and indicating detection of said second full-wave A.C. power signal to said control means.

5. A method of remotely controlling an appliance coupled to an A.C. load line producing a first full-wave A.C. power signal having a first peak voltage, said method comprising the steps of:

providing at least one signaling circuit comprising a switch and a zener diode;

generating with said zener diode a second full-wave A.C. power signal having a peak voltage less than said first peak voltage when the switch is open;

bypassing said zener diode and generating said first A.C. power signal when said switch is closed;

providing a receiver coupled in series with and remotely located from the signaling circuit for detecting said second full-wave A.C. power signal on said A.C. load line; and controlling said appliance in response to the detection of said second full-wave power signal.

6. The method of claim 5 wherein said step of providing a receiver comprises the steps of:

providing in the receiver a reference voltage circuit for storing a reference voltage A.C. power signal;

providing a signal detection circuit connected to said reference voltage circuit and said at least one signaling circuit for comparing the reference voltage A.C. power signal to said output signal and outputting a detection signal when said reference voltage A.C. power signal differs from said output signal; and providing at least one counter circuit connected to said signal detection circuit for counting detection signals and indicating detection of said second full-wave A.C. power signal to said control means.

7. The method of claim 5 further comprising the step of:

disposing said diode and switch in parallel.

8. The method of claim 5 further comprising the steps of:

providing a main power switch in series with said signaling circuit and said A.C. load line; and disabling said signaling circuit when said main power switch is open.

* * * * *